Aug. 4, 1925.
H. S. JANDUS
CLAMP FOR VEHICLE BUMPERS
Filed Nov. 11, 1922
1,548,141
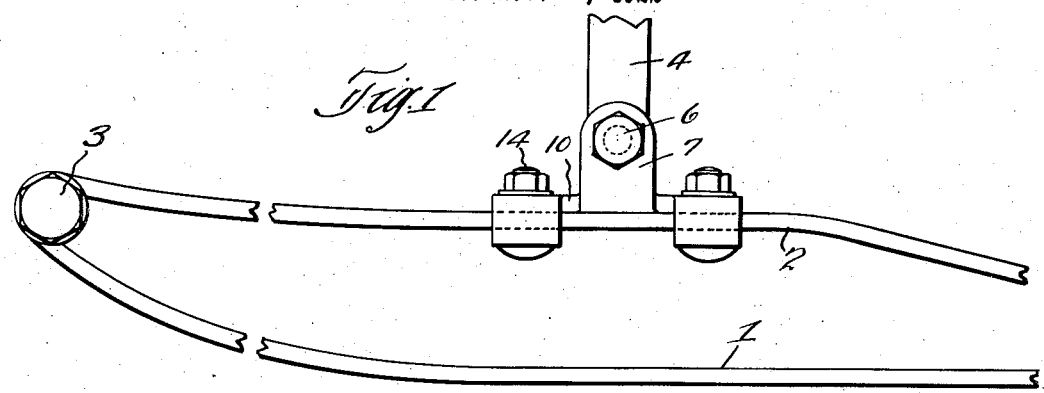
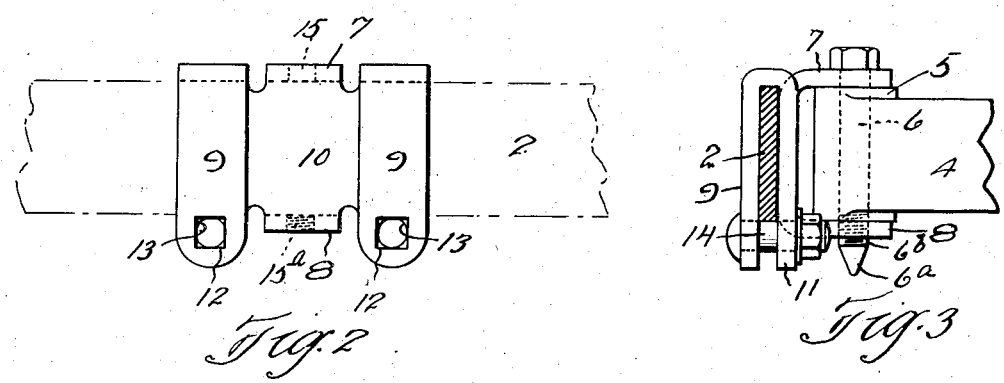
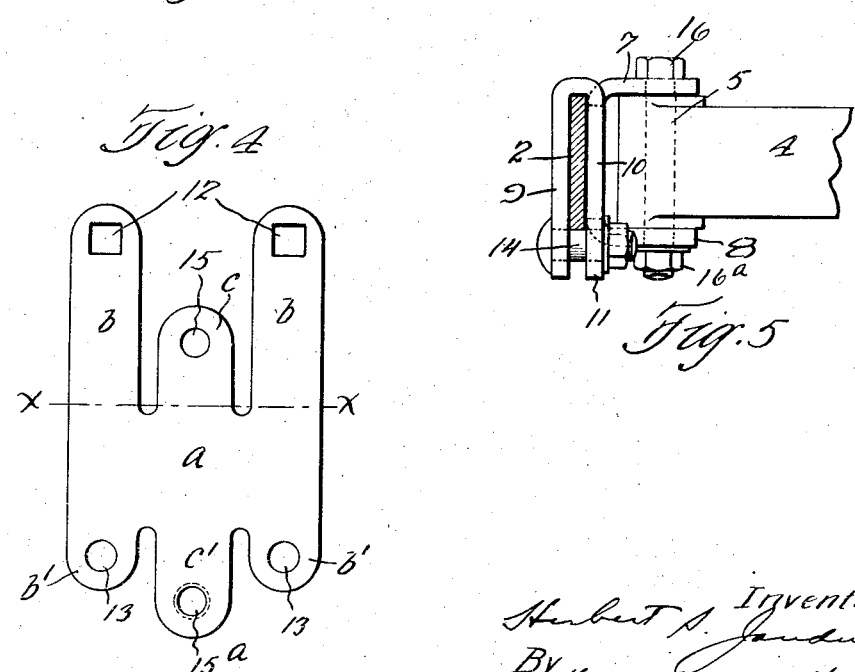
Herbert S. Jandus, Inventor
By Hull, Brock & West, Attys.

Patented Aug. 4, 1925.

1,548,141

UNITED STATES PATENT OFFICE.

HERBERT S. JANDUS, OF DETROIT, MICHIGAN, ASSIGNOR TO THE C. G. SPRING & BUMPER COMPANY, OF DETROIT, MICHIGAN, A CORPORATION OF DELAWARE.

CLAMP FOR VEHICLE BUMPERS.

Application filed November 11, 1922. Serial No. 600,421.

*To all whom it may concern:*

Be it known that I, HERBERT S. JANDUS, a citizen of the United States, residing at Detroit, in the county of Wayne and State of Michigan, have invented a certain new and useful Improvement in Clamps for Vehicle Bumpers, of which the following is a full, clear, and exact description, reference being had to the accompanying drawings.

This invention relates to bumpers for automobiles and similar vehicles, and more particularly to the means whereby such bumpers are connected to and supported from the brackets or arms which in turn are carried by the ends of the side frames of such vehicles. It is the general purpose and object of this invention to provide a connecting device of this character which may be conveniently and economically produced, preferably from pressed metal and which is capable of performing its functions in an efficient manner.

I accomplish the foregoing objects in and through the construction shown in the drawings forming a part hereof, wherein Fig. 1 represents a plan view of one end of a bumper showing my invention applied thereto; Fig. 2 a front elevation of my clamping device, the relation of the bumper plate thereto being indicated by dot-and-dash lines; Fig. 3 a sectional side elevation showing my clamping device; Fig. 4 a plan view of the blank from which the device is formed; and Fig. 5 a view similar to Fig. 3, showing a modification of the clamping device.

Describing the various parts herein by reference characters and in connection with Figs. 1-4 inclusive, 1 denotes the front bar or plate and 2 the rear bar or plate of a double bumper of the flat spring-plate type. The ends of the bars or plates 1 and 2 are connected in any convenient manner, as by having eyes formed therein through which a bolt 3 extends. The bumper may be of any approved construction, the one shown herein being of the type illustrated in McGregor Patent No. 1,372,154 issued March 22, 1921.

The bumper is supported from the vehicle frame (not shown) by a pair of arms, one of which is indicated at 4, each arm having its rear or inner end secured to the corresponding side member of the vehicle and having at its front or outer end a sleeve or eye 5 adapted to receive a vertical pivot shown in Fig. 3 as a cap screw 6 extending through the top and bottom arms 7 and 8 of my clamping device and threaded into the opening in the arm 8. By securing the clamping devices to the rear or inner bar 2 of the bumper, the latter may be pivotally mounted upon the arms 4.

In practice, the clamping device may be conveniently made from a single metal stamping, shown in Fig. 4, and comprising a body or web portion $a$ having a pair of arms $b$ projecting upwardly from opposite ends of the same, with a shorter arm $c$ arranged intermediate the arms $b$. From the bottom of the body $a$ projects an arm $c'$, similar and complementary to the arm $c$ while short arms $b'$ project from the bottom of the body or plate $a$ complementary to the arms $b$.

In forming the aforementioned stamping into a clamping device, the arms $b$ are bent outwardly and then downwardly, forming the spaced members 9 of the clamipng device, the lengths of the arms and of the body $a$ being such that, when thus bent, the lower ends of the arms $b$ will be in line with the lower ends of the arms $b'$. The arms $c$ and $c'$ are bent at right angles to the body $a$ and form the arms 7 and 8, respectively, the distance between said arms 7 and 8 being such as to receive therebetween the appropriate sleeve or eye 5. When thus bent to shape, the body part $a$ forms a central plate 10, between the arms 9, adapted to engage the rear or inner face of the rear or inner bar 2, while the arms 7 and 8 project rearwardly or inwardly from the top and bottom of such plate, respectively. The arms 9 extend down in front of the plate 10, parallel therewith, registering with the lower ends of the short arms 11 which project downwardly from the bottom of the plate $a$. The blank is provided with suitable holes 12 and 13 for the reception of bolts 14 which will extend through the lower ends of the arms 9 and 11 and beneath the rear bar or plate 2, which is received within the inverted channel provided therefor between the arms 9 and the plate 10. Similar openings 15, 15$^a$ in the arms $c$ and $c'$ receive the cap screw 6. It will be noted that the lower end 6$^a$ of the cap screw is pointed, being threaded thereabove, as indicated at 6$^b$, for engagement with the thread within the aperture 15a. Should it be desirable to disconnect one side of the bumper from its supporting arm 4, either for permitting access to the front of the automobile or to permit access to a tire or spare wheel or the like at the rear of an automobile, such disconnection may be very readily effected by merely unscrewing the cap bolt from one of the clamps and then swinging the bumper about the other cap bolt as a pivot. In replacing the clamp upon its arm 4, the pointed lower end 6a of the cap screw enables the lower end to be readily entered into the sleeve or eye 5 and into the aperture 15a in the clamp.

In Fig. 5 there is shown a modification of my invention wherein the arms 7 and 8 are provided with smooth bores or apertures for the reception of a bolt 16, the bolt being retained in position by means of a nut 16a. In other respects, the clamping device is identical with that shown in the preceding view.

By the construction shown and described herein, I am enabled to make a clamp from a single piece of metal, thus preventing the dropping or loss of parts which is liable to occur when a two-part clamp is used. Furthermore, I am enabled to produce such a clamp from a piece of sheet metal by simple stamping and shaping operations, thereby materially reducing the expense of production. A further advantage in the invention results in the fact that, being made of one piece, there are no loose parts in the clamp proper to produce rattling. The style of clamping device enables a bumper to be quickly connected to and disconnected from either or both of its arms 4; and the pointed cap screw with the threaded aperture 15a greatly facilitates the assembly and disassembling operations.

Having thus described my invention, what I claim is:

1. A clamp for securing an automobile bumper to its supporting arm, said clamp comprising a single piece of metal having an intermediate body portion adapted to engage one face of a bumper plate and a pair of spaced arms extending substantially parallel with such body portion and adapted to engage the opposite face of such plate, there being a pair of inwardly or rearwardly projecting arms extending from the top and the bottom of such body respectively and providing means for attaching the clamping device to said supporting arm.

2. A clamp for securing an automobile bumper to its supporting arm, said clamp comprising a single piece of metal having an intermediate body portion adapted to engage one face of a bumper plate and a pair of spaced arms extending substantially parallel with such body portion and adapted to engage the opposite face of such plate and forming a channeled seat with such body portion, there being a pair of inwardly or rearwardly projecting arms extending from the top and the bottom of such body respectively and providing means for attaching the clamping device to said supporting arm.

3. A clamping device for securing an automobile bumper to its supporting arm, the said device comprising an integral plate having a body portion adapted to contact with one face of a bumper bar or plate, there being spaced projections adapted to extend below such bar or plate and a pair of spaced arms extending substantially parallel with such body and such extensions and adapted to engage the opposite face of a bumper bar or plate, the cooperating ends of said extensions and of said arms having openings for the reception of fastening devices and the intermediate body portion having an upper and a lower arm projecting inwardly or rearwardly therefrom and each having an aperture for the reception of means for securing the same to said supporting arm.

4. A clamping device for securing an automobile bumper to its supporting arm, the said device comprising an integral plate having a body portion provided with spaced projections adapted to extend below such bar or plate and with a pair of spaced arms extending substantially parallel with such body and such extensions and forming with such body portion a channeled seat for a bumper bar or plate, fastening devices engaging the cooperating ends of said extensions and of said arms below said seat, the intermediate body portion having an upper and a lower arm projecting inwardly or rearwardly therefrom for attachment to the said supporting arm.

5. A clamping device for securing an automobile bumper to its supporting arm, said device comprising an integral plate having a body portion adapted to bear against one face of the bumper bar or plate and having at each end thereof a downwardly extending projection and also having at each end thereof an arm bent from the body of such plate and forming with such body and such extensions an upwardly extending channel for the reception of the bumper bar or plate, the lower ends of such extension and of such arms having apertures for the reception of connections and the intermediate body portion having inwardly or rearwardly extending arms also having apertures for the reception of a connection whereby the clamping device may be pivotally supported from such arm.

6. A clamp for securing an automobile bumper to its supporting arm, said clamp comprising a single piece of metal having an intermediate body portion adapted to engage one face of a bumper plate and a pair of spaced arms extending substantially parallel with such body portion and adapted to engage the opposite face of such plate, there being a pair of inwardly or rearwardly projecting arms extending from the top and the bottom of such body respectively and providing means for attaching the clamping device to said supporting arm, the last mentioned arms being provided with aligned apertures, one of said apertures being threaded for the reception of the end portion of a cap screw.

In testimony whereof, I hereunto affix my signature.

HERBERT S. JANDUS.